April 27, 1943.  S. W. HAYES  2,317,526
TORCH CUTTING APPARATUS
Filed March 20, 1940   8 Sheets-Sheet 1

Inventor:
Stanley W. Hayes
By Williams, Bradbury, & Hinkle
Attys.

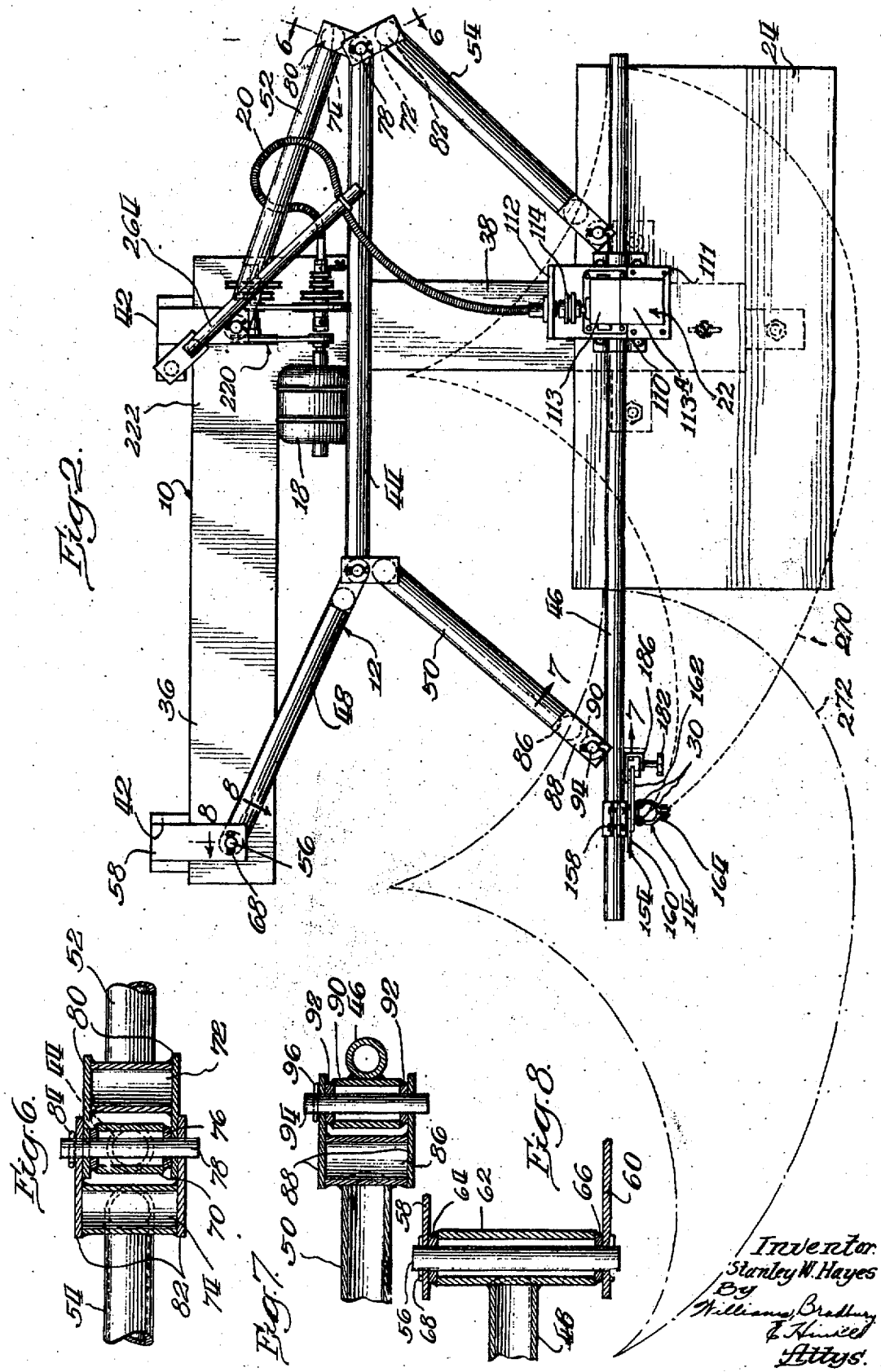

April 27, 1943. S. W. HAYES 2,317,526
TORCH CUTTING APPARATUS
Filed March 20, 1940 8 Sheets-Sheet 3
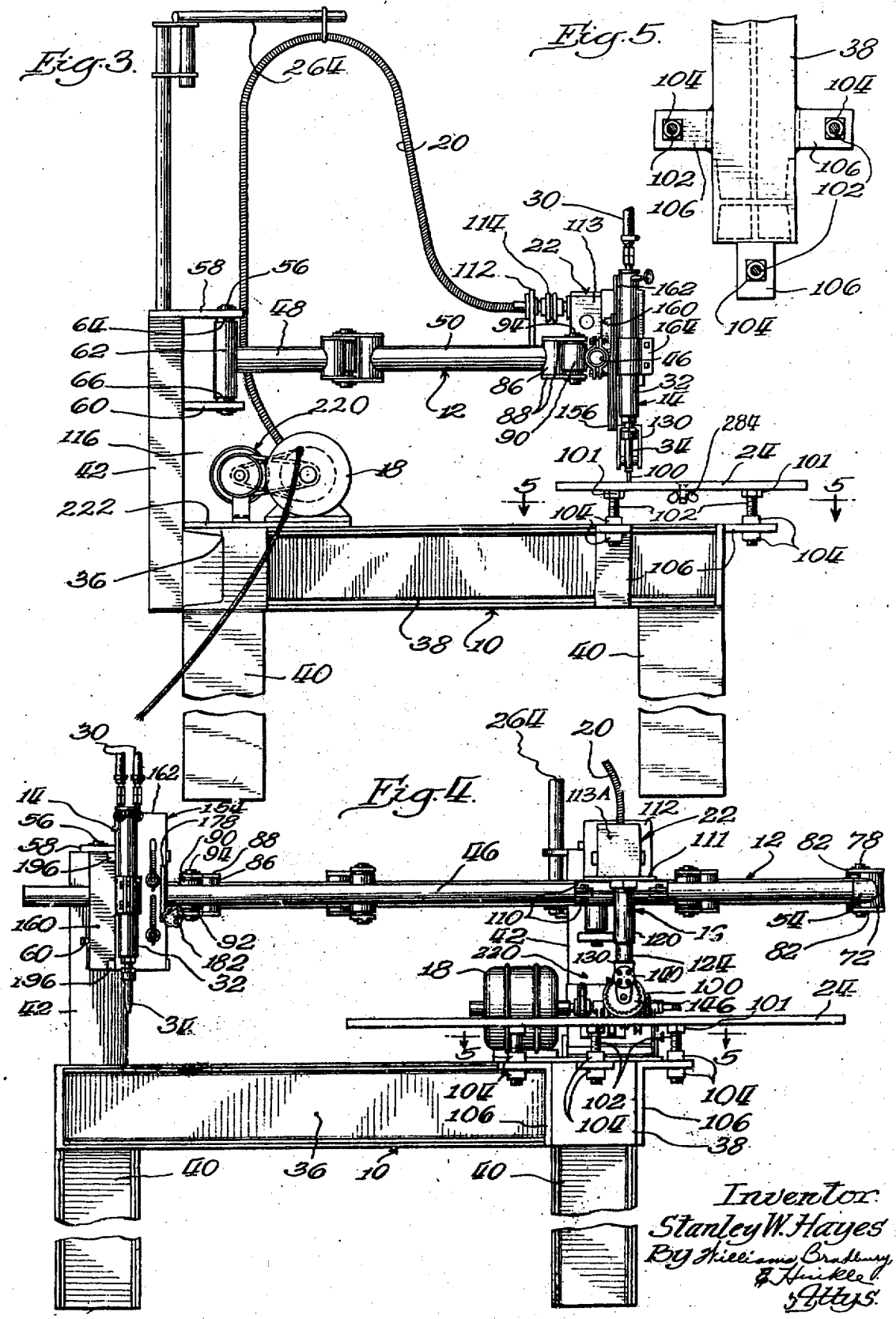
Inventor
Stanley W. Hayes April 27, 1943. S. W. HAYES 2,317,526
TORCH CUTTING APPARATUS
Filed March 20, 1940 8 Sheets-Sheet 4
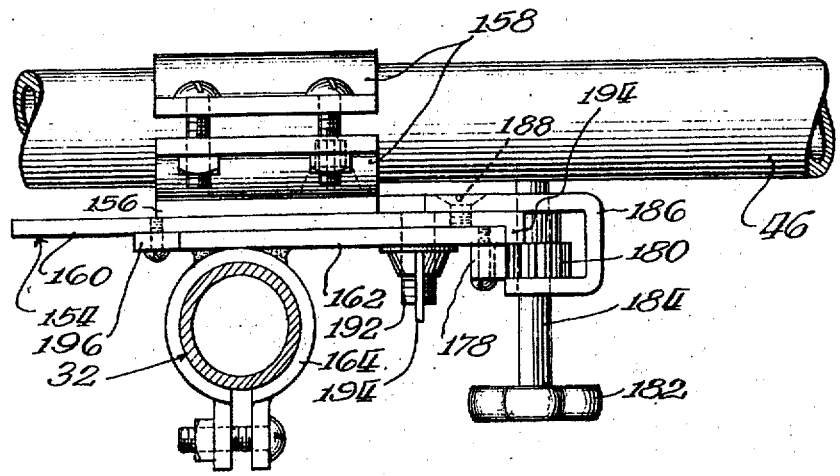
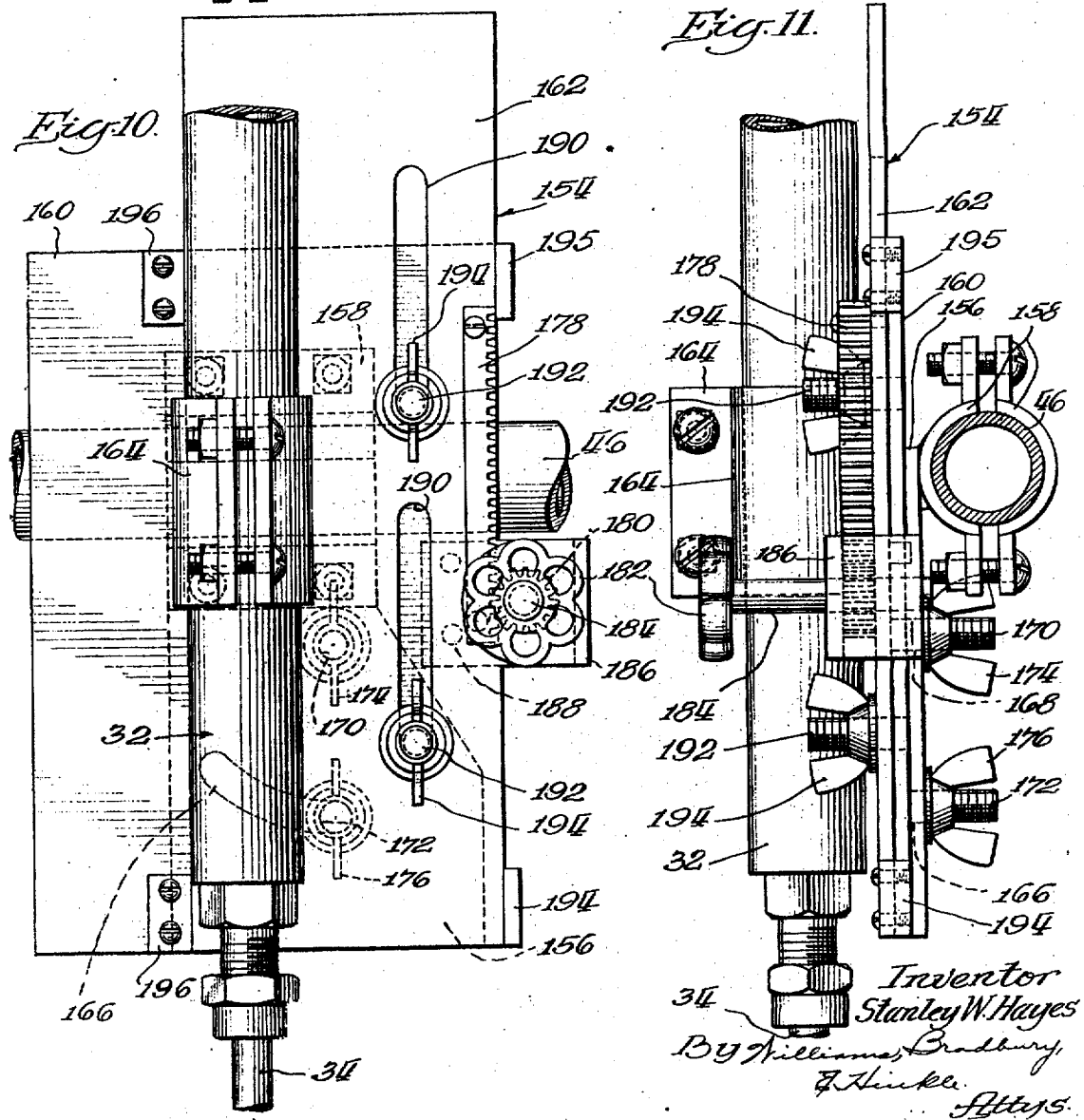
Inventor
Stanley W. Hayes
By Williams, Bradbury,
& Hinkle
Attys.

April 27, 1943.  S. W. HAYES  2,317,526
TORCH CUTTING APPARATUS
Filed March 20, 1940   8 Sheets-Sheet 5
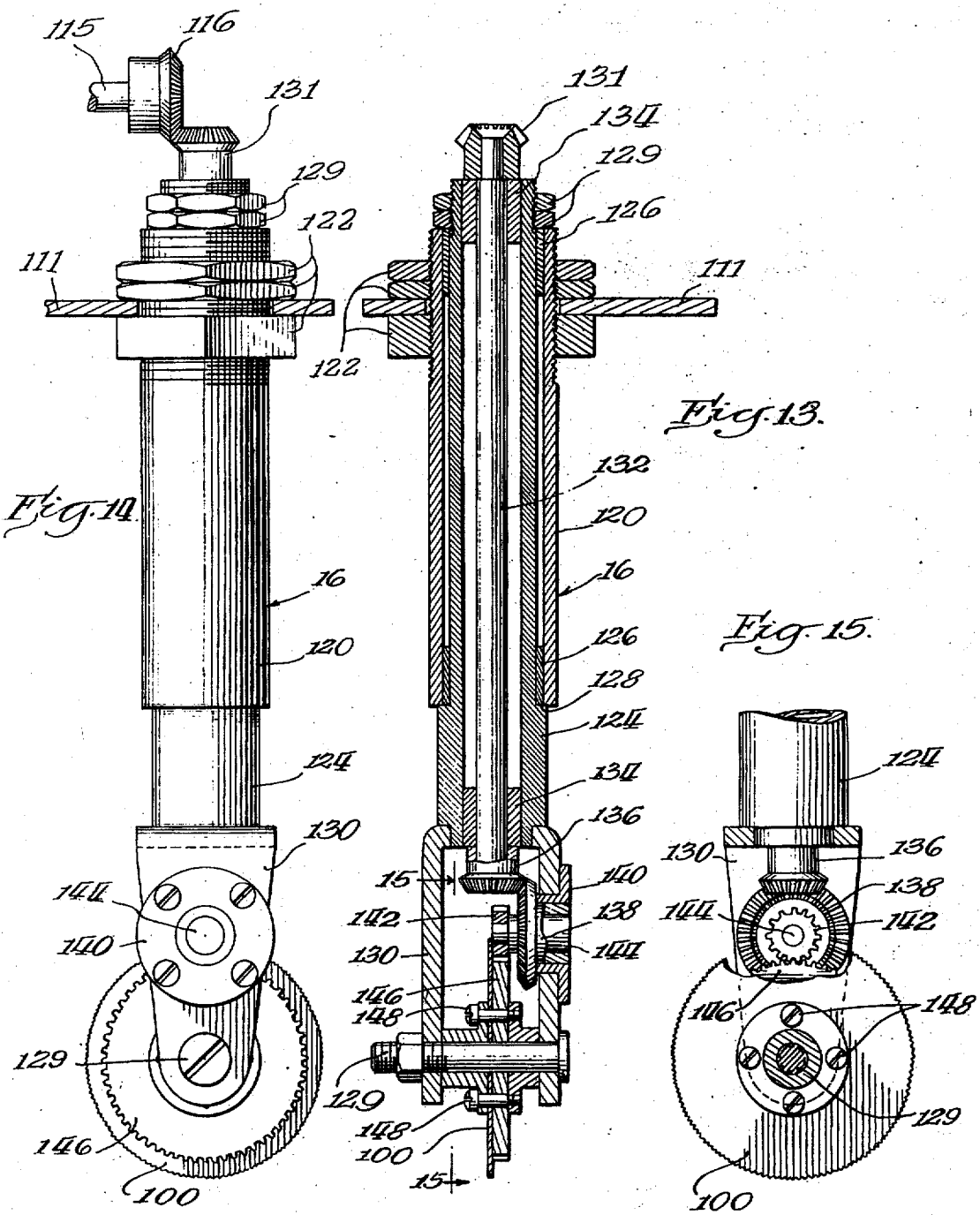
Inventor.
Stanley W. Hayes
By Williams, Bradbury, E. Hinkle
Attys.

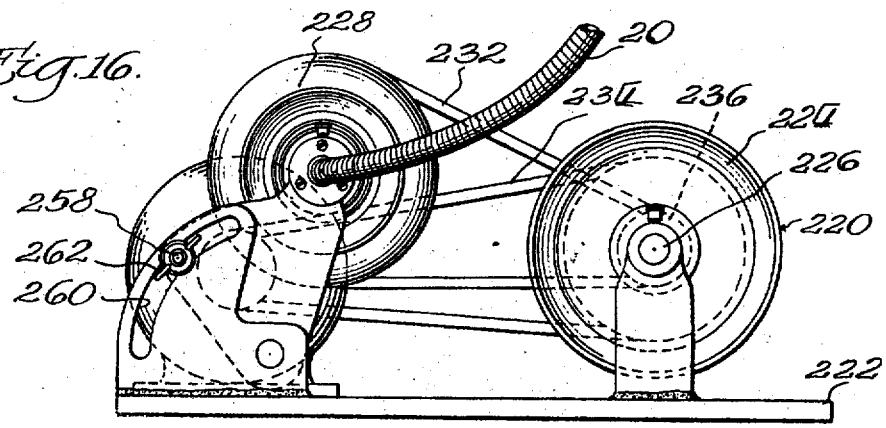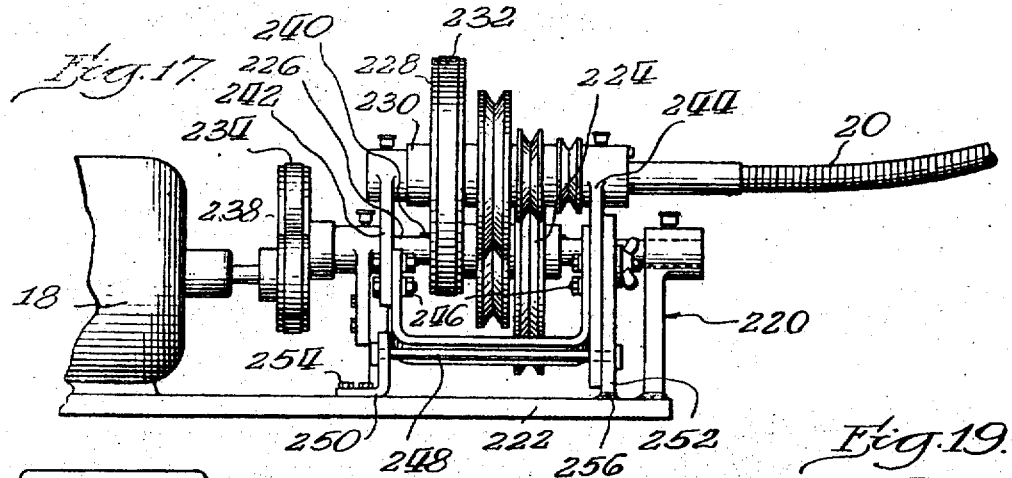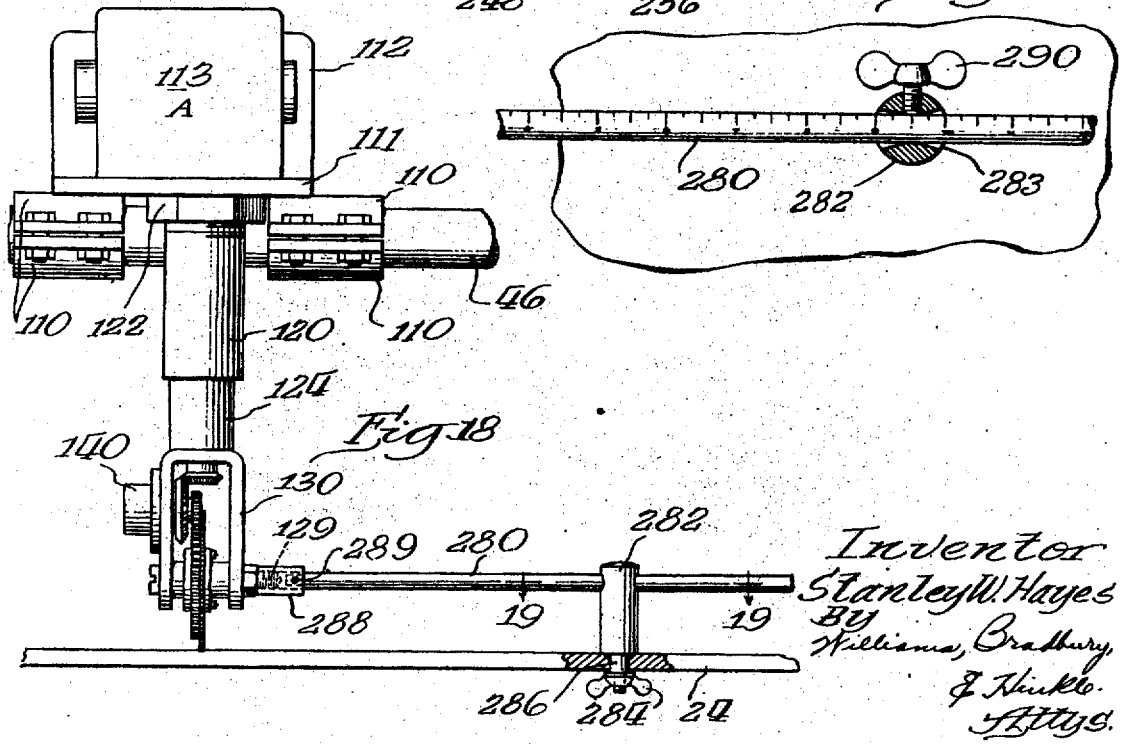

April 27, 1943. S. W. HAYES 2,317,526
TORCH CUTTING APPARATUS
Filed March 20, 1940 8 Sheets-Sheet 7
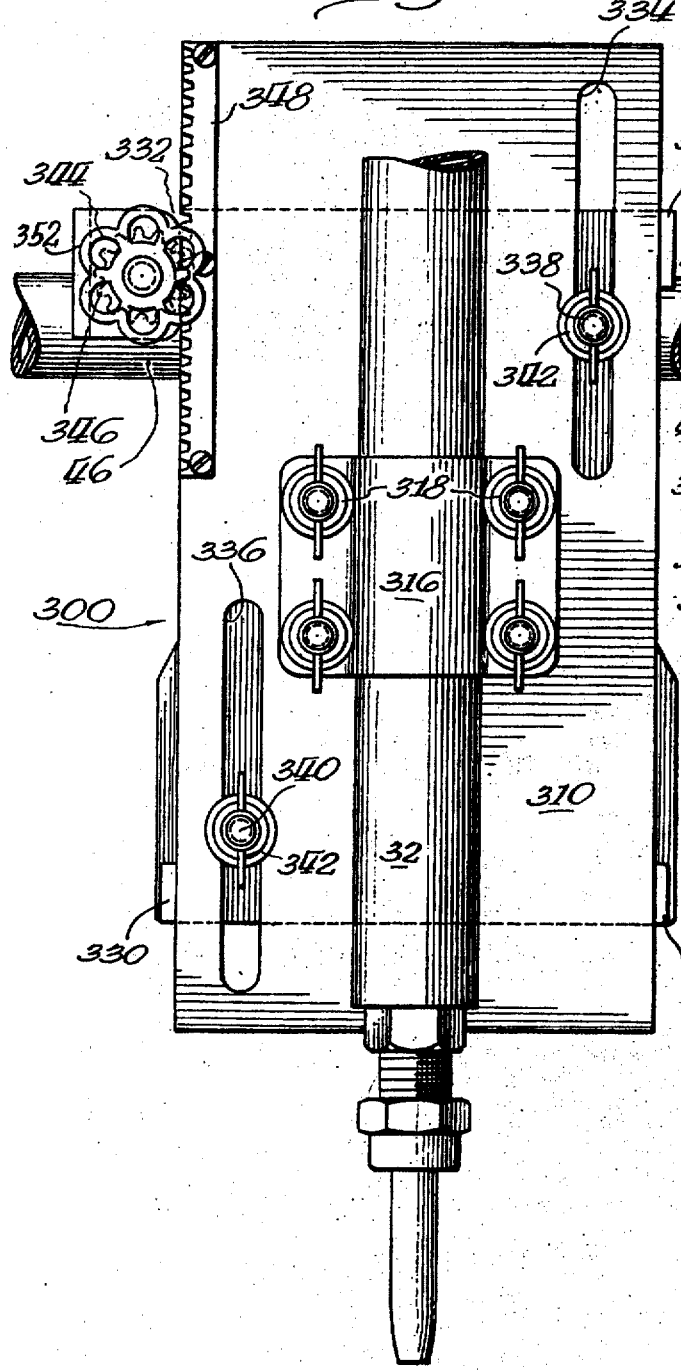
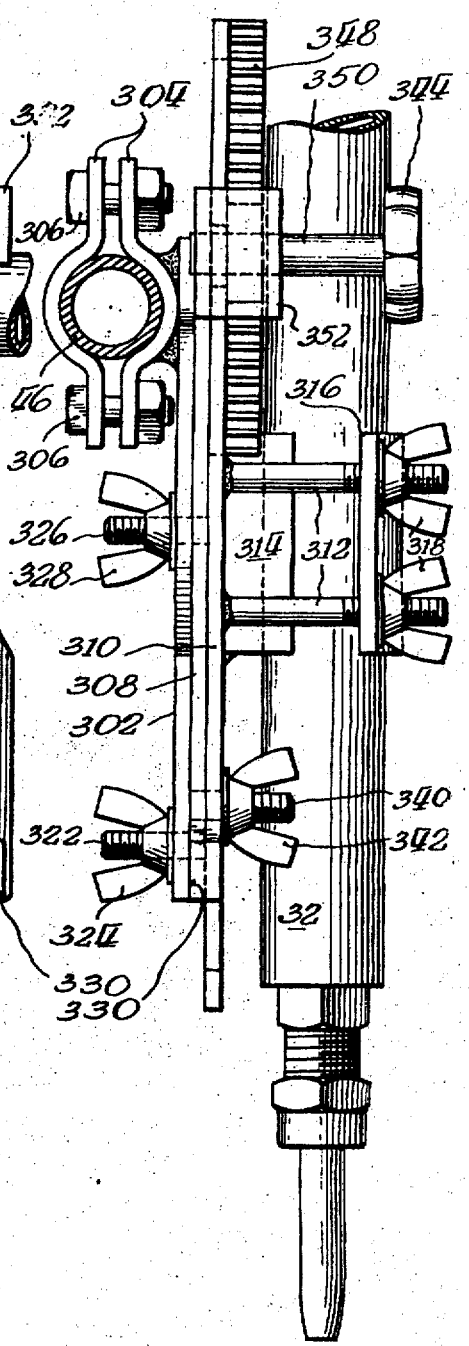
Inventor
Stanley W. Hayes
By Williams, Bradbury & Hinkle
Attys.

April 27, 1943. S. W. HAYES 2,317,526
TORCH CUTTING APPARATUS
Filed March 20, 1940 8 Sheets-Sheet 8
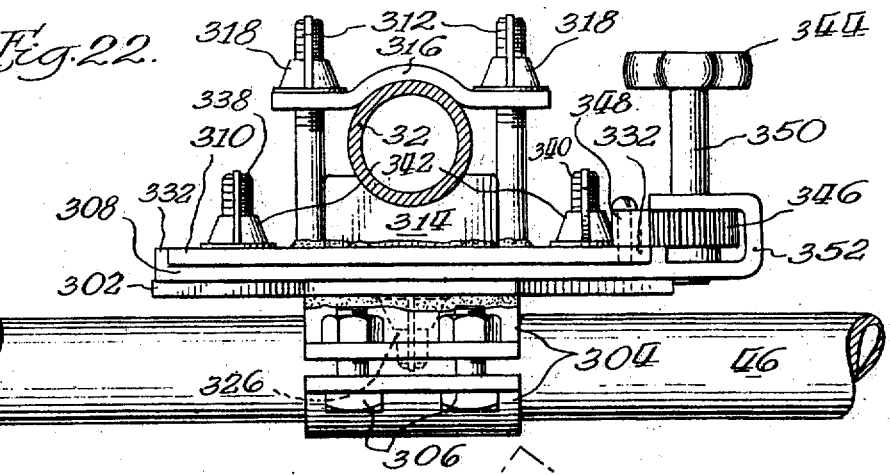
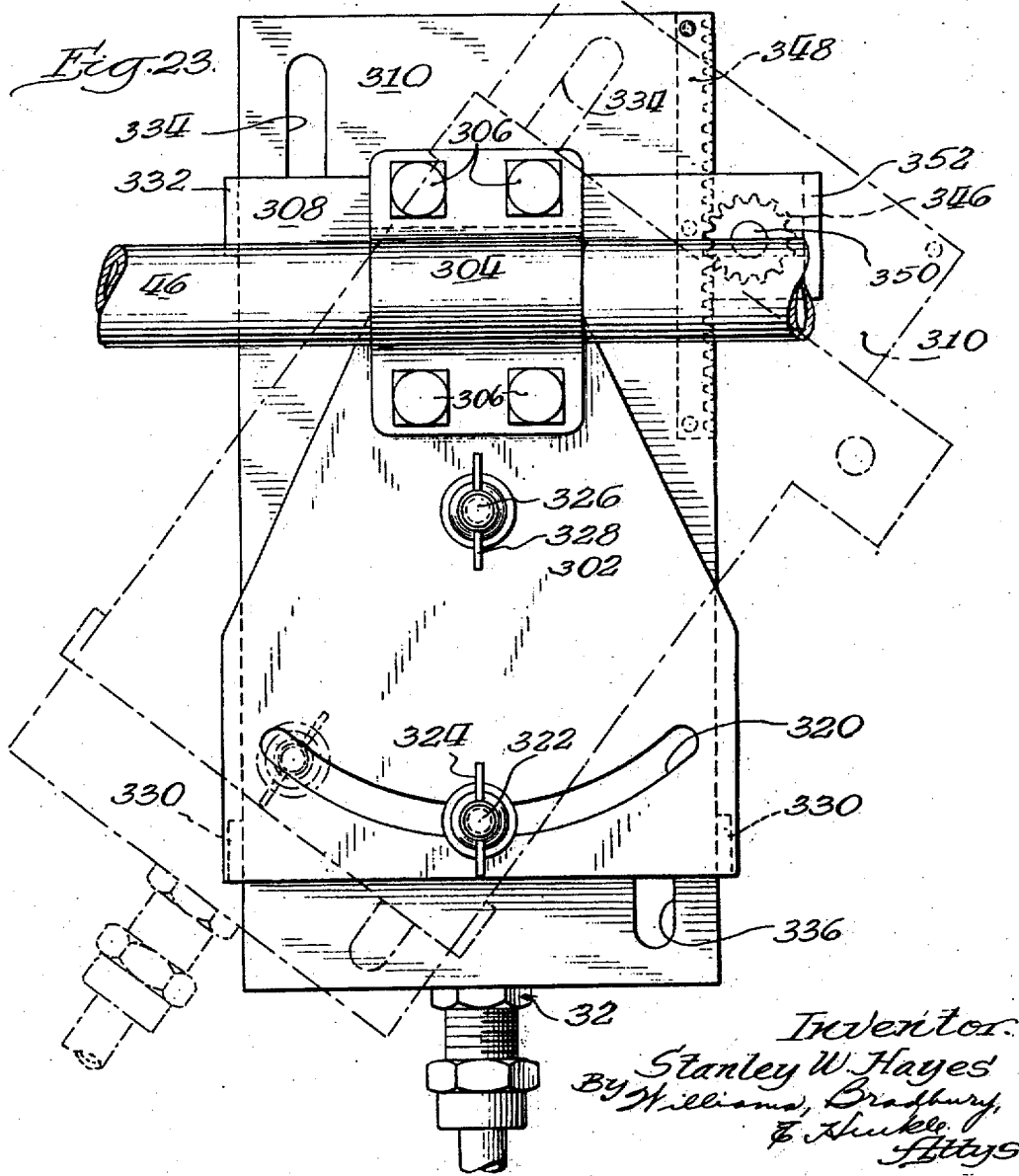
Inventor.
Stanley W. Hayes
By Williams, Bradbury, & Hinkle
Attys.

Patented Apr. 27, 1943

2,317,526

UNITED STATES PATENT OFFICE 2,317,526

TORCH CUTTING APPARATUS

Stanley W. Hayes, Richmond, Ind., assignor to Hayes Track Appliance Company, Richmond, Ind., a corporation of Indiana Application March 20, 1940, Serial No. 325,084

13 Claims. (Cl. 266—23)

The present invention relates to metal working apparatus and particularly to apparatus of the type in which metal cutting means is so mounted that it duplicates the movement of a combined guiding, tracing and propelling means. Certain features of this invention are disclosed and claimed in a copending divisional application, Serial No. 456,144, filed August 26, 1942.

Generally speaking, apparatus of the type to which this invention pertains has been known and used for a considerable period. This apparatus comprises a cutting means, generally termed a torch and employing a gaseous medium or mediums that provide an exceedingly hot flame when ignited, mounted upon a pantograph. The pantograph is a device universally movable over a plane surface, the area of which is determined by the physical dimensions of the pantograph. The pantograph is propelled through the intermediary of a tracing wheel and the torch duplicates the movement of the wheel.

It is the primary object of the present invention to provide a new and improved torch cutting apparatus of this type and particularly an apparatus having a frame and pantograph that can be fabricated and economically from metallic plates, tubes and sections.

Another object of the invention is to provide a new and improved pantograph that can be economicaly fabricated from relatively simple parts readily secured together in operative relationship as by welding, and one which is readily movable in the plane of the pantograph but which is substantialy rigid in a vertical plane.

A further object of the invention resides in the provision of a new and improved frame constructed from metal sections in substantially an L-shape, whereby the tracing table may be mounted over the shorter leg of the L and the material to be worked may be placed immediately adjacent the table and directly underneath the pantograph.

A further object of the invention is to provide an apparatus of this type with a tracing table that is universally adjustable vertically within certain limits whereby the table may be adjusted to compensate for wear or deformation of the pantograph asembly, and the table may be moved vertically to secure proper relationship between the tracing wheel and templets of different thickness.

A further object of the invention is to provide a new and improved mounting for the torch so that it can be readily adjusted in a plurality of directions. This object is attained by mounting the torch on a carriage that is rotatable within predetermined limits and movable longitudinally of the torch irrespective of its angular position and which is mounted also for rotation upon one of the elements of the pantograph. The advantages resulting from this construction are the ability to cut metal either vertically or on a slant, and ease of adjustment of the torch with respect to the metal to be cut.

A still further object of the invention is to provide an apparatus of the class described in which a plurality of types of torches may be used and in which the change from one type of torch to another may be accomplished without los of time and with a minimum of effort.

Further objects and advantages of the invention will become apparent from the ensuing description, in the course of which reference is had to the accompanying drawings in which:

Fig. 2 is a plan view of the apparatus illustrated in Fig. 1. The limits of movement of the tracing wheel and torch are indicated in outline;

Fig. 3 is a side elevation of the apparatus with the tracing wheel turned 90° from the position in which it is illustrated in the preceding figures;

Fig. 4 is a partial front elevation of the apparatus with the tracing wheel occupying the same position as in the preceding figure;

Fig. 5 is a horizontal cross sectional view taken along the line 5—5 of Fig. 3 illustrating details of construction of the tracing table support;

Fig. 6 is a vertical cross sectional view taken along the line 6—6 of Fig. 2 illustrating the construction of the improved pivotal joint between the rear longitudinal arm and one of the two pairs of cross arms of the pantograph;

Fig. 7 is a similar view of the improved pivotal joint between the front longitudinal and cross arms of the pantograph; the view is taken along the line 7—7 of Fig. 2;

Fig. 8 is a view similar to the two proceding figures of the joint between the fixed support and cross arms of the pantograph; the view is taken along the line 8—8 of Fig. 2;

Fig. 9 is an enlarged top plan view, partly in section, of the torch supporting means;

Fig. 10 is an enlarged front elevation showing further details of the torch supporting means;

Fig. 11 is an enlarged side elevation of the portion of the apparatus shown in Fig. 10;

Fig. 13 is a vertical cross sectional view through the tracing wheel support and the portion of the propulsion mechanism lodged therein;

Fig. 14 is a side elevation of the same;

Fig. 15 is a section, partly broken away, taken along the line 15—15 of Fig. 13 illustrating details of construction of the tracing wheel driving mechanism;

Figs. 16 is a side elevational view of the driving motor and change speed unit;

Fig. 17 is a fragmentary front elevational view of the apparatus shown in Fig. 16;

Fig. 18 is a front elevational view, partly in section, of the attachment of the present invention provided for the purpose of cutting circles;

Fig. 19 is a fragmentary horizontal section taken along the line 19—19 of Fig. 18;

Fig. 20 is a front elevational view upon an enlarged scale of a modified form of torch-supporting means;

Fig. 21 is a side elevational view of the torch-supporting means shown in Fig. 20;

Fig. 22 is a plan view of the same;

Fig. 23 is a rear elevational view of the same, showing in phantom the torch-supporting means in one of its adjusted positions.

Figure 1:
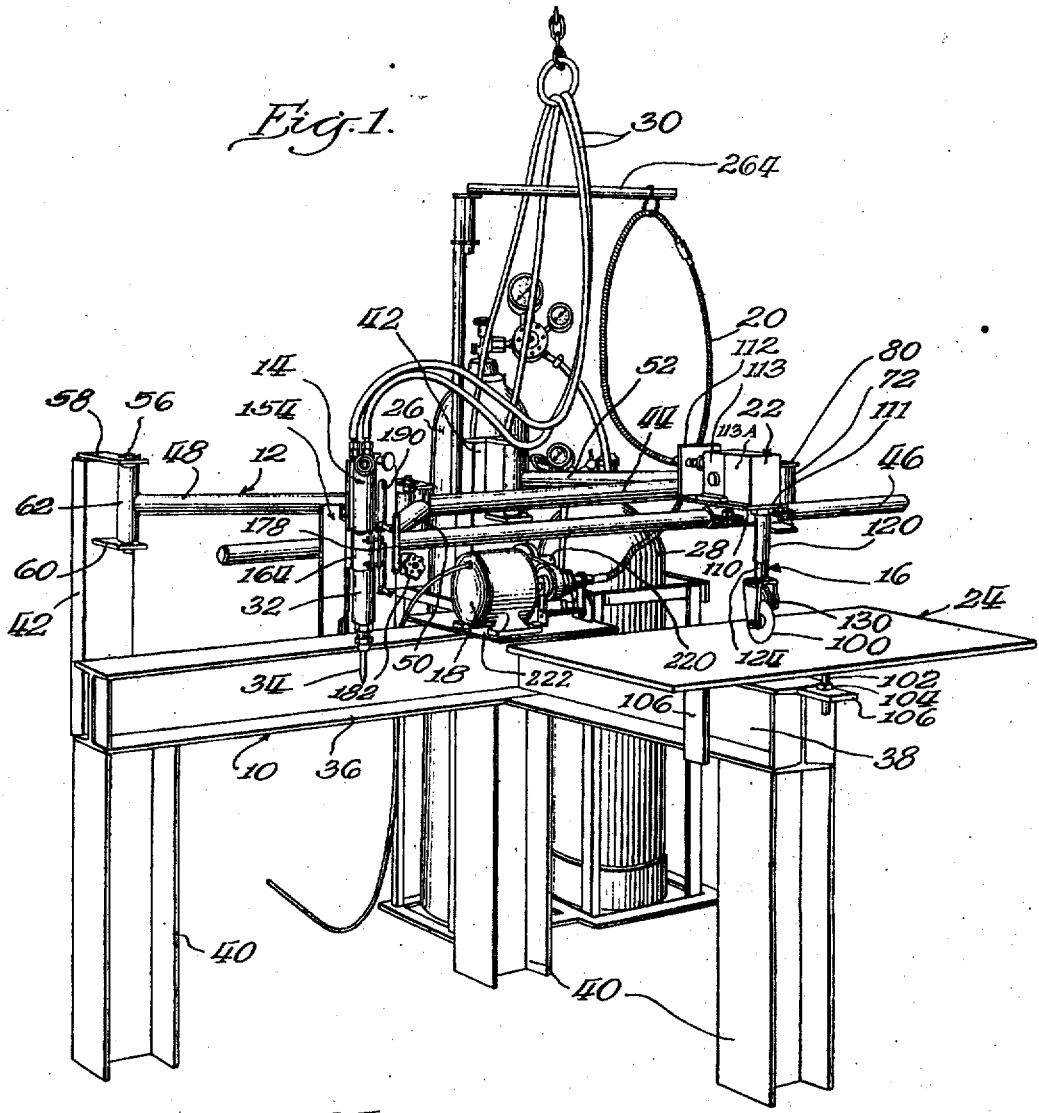
Fig. 1 is a perspective view of a complete torch cutting apparatus.

Referring first to Fig. 1, it may be seen that the improved torch cutting apparatus of the present invention comprises a substantially L-shaped frame 10 upon which is mounted a pantograph assembly indicated generally by reference numeral 12. Upon the pantograph is mounted a material working means, here illustrated as a metal cutting torch 14 of the type adapted to form a combustible mixture of suitable gases which, when ignited, produce a very high temperature flame suitable particularly for cutting metals. The pantograph assembly is both guided, propelled and partly supported by means of a swiveled tracing wheel assembly indicated generally by reference numeral 16. The tracing wheel is propelled either manually or by means of an electric motor 18 mounted upon the stationary support 10 and connected to the tracing wheel through a flexible shaft 20 and a speed reducing mechanism 22 mounted directly upon the pantograph structure. The tracing wheel proper, the construction of which will be described in greater detail hereinafter, is located in such manner that it ordinarily overlies and is in contact with an adjustably mounted tracing wheel table 24.

Before proceeding with a consideration of the details of construction of the various parts that have been mentioned briefly above, it may be well to state that the gaseous mediums supplied to the torch 14 are obtained from suitable supply tanks 26 and 28 connected by individual flexible tubes 30 to the torch. The torch itself may be of any well known construction and the torch illustrated in Fig. 1 may be seen to comprise a relatively long cylindrical portion 32 and a nozzle or tip 34.

The improved L-shaped stationary support of the present invention is fabricated from a plurality of lengths of metal of H-section. Two horizontally disposed sections 36 and 38 are united together to form an L-shaped figure, the longer leg 36 of which may be termed a longitudinal rear leg and the shorter leg 38 a forwardly extending leg. The L-shaped frame is supported above the floor, or any suitable base, by three vertically disposed legs 40, welded to the frame at the ends and intersection of the two legs of the L.

The pantograph assembly 12 is pivotally mounted upon the stationary frame 10 by means of two spaced apart upright members 42 of channel section welded to the rear and to the ends of the longitudinal leg 36 of the L-shaped frame.

One of the important features of the present invention lies in the construction of the pantograph per se, which is disclosed and claimed in the previously mentioned divisional application, Serial No. 456,144, filed August 26, 1942. As the description proceeds, it will become apparent that the pantograph can be fabricated economically and simply from a number of lengths of metallic tubing and a few small pieces of metal plate. Not only does the novel pantograph structure of the present invention have the advantages just mentioned, but it also has the advantage that it is readily movable in the plane of the pantograph and it is substantially rigid in a vertical plane.

Referring now more particularly to Figs. 2 and 6 to 8, inclusive, it may be seen that the pantograph structure comprises a pair of spaced apart longitudinal tubular arms 44 and 46 and two pairs of tubular transverse or cross arms 48, 50 and 52, 54. The cross arms 48 and 52 are pivotally mounted in the previously mentioned spaced apart supports 42 in a manner to be described more fully hereinafter. The rear longitudinal arm 44 is pivotally mounted at one end with respect to the cross arms 52 and 54. The front longitudinal arm 46 is pivotally mounted to the front ends of the cross arms 50 and 54 and, as shown in Fig. 2, the pivotal connection of the cross arms to the longitudinal arms is at spaced apart points lying intermediate the ends of the longitudinal arm. The details of construction of the various pivotal mountings will now be described, and since there are two joints of each type, only one of each will be referred to specifically.

The pivotal joint between the rear cross arms 48 and 52 and one of the fixed supports 42 is illustrated in Fig. 8. Upon reference to this figure, it may be seen that the pivotal joint comprises a loosely mounted pivot pin 56 extending through a pair of parallel vertically spaced apart perforated plates 58 and 60, constituting a bracket, secured as by welding to the support 42. The mounting comprises also a relatively short tubular member 62 welded intermediate its ends to the end of the cross arm thereby to form a substantially T-shape structure. A pair of perforated metal plates 64 and 66 are welded to the opposite ends of the tubular member 62. The perforations are in alignment with each other so that when all the perforations in the parallel plates are in alignment, the pin 56 may be passed therethrough to form a pivotal mounting that permits easy movement in the plane of the pantograph and prevents any substantial movement in a vertical plane. The pin is suspended in position by means of a cotter pin 68 passing through the upper end thereof.

The two remaining types of pivotal mountings are constructed in such manner as to utilize the principles just described. The pivotal mounting of the longitudinal arm 44 and the cross arms 52 and 54 is illustrated in Fig. 6. Referring now to this figure, it may be seen that the arms 44, 52 and 54 have welded to their adjacent ends relatively short tubular members 70, 72 and 74, respectively, of different lengths to form a plurality of T-joints. Member 70 is the shortest and it has its opposed openings closed by a pair of plates 76, having a central perforation in which is journaled the pivot pin 78. In similar fashion the opposed openings of the tubular members 72 and 74 are closed by elongated perforated plates 80 and 82, respectively. The plates are all of substantially the same thickness and in view of the fact that the tubular members to which they are welded are of different lengths, the plates lie in different and adjacent planes so that when the perforations are placed in alignment, the pin 78 may be passed readily therethrough, thereby to provide a pivotal mounting that permits easy movement in the plane of the pantograph, but which tends to prevent substantial movement in a vertical plane. The pin 78 is prevented from dropping through the aligned openings by a cotter pin 84.

The pivotal mounting of the front longitudinal arm 46 and front cross arm 50 is illustrated in Fig. 7. From this figure it may be seen that the cross arm has welded to its forward end a relatively short tubular member 86 that has its opposed openings closed by elongated flat perforated plates 88. In view of the fact that it is desirable to mount the front arm 46 intermediate its ends because of the length of the latter, the latter has the vertically disposed, reltively short tubular members 90 welded to one side of the arm, as illustrated best in Fig. 7. The open ends of the last-mentioned member are closed by a pair of relatively flat angular plates 92 having aligned apertures therethrough so that the two arms 46 and 50 may be pivotally mounted with respect to each other by passing a pin 94 therethrough. The pin is held in place by a cotter pin 96.

The pantograph assembly is supported in part by the adjustably mounted tracing wheel table 24 upon which the knurled tracing wheel 100 normally rests. The table has been mounted upon a three-point support illustrated best in Figs. 3, 4 and 5, to provide universal adjustability so that the table may be adjusted to compensate for wear or deformation of the pantograph, for templets of different thickness, and the like. Referring now to these figures it may be seen that the table has welded to its underside three nuts 101 adapted threadedly to receive studs 102, each adjustably mounted by means of opposed nuts 104 in brackets 106 welded to the forwardly extending leg 38 of the stationary support. By suitably positioning the nuts 104, the table 24 may be adjusted to lie in any plane within limits determined by the proportions of the structure. This construction, as indicated above, provides a simple arrangement for securing at all times a proper bearing of the tracing wheel upon the table. Furthermore, by removably mounting the studs in the nuts 101, possible damage to the studs during shipment is avoided as the studs can be placed in position at the destination.

The tracing wheel assembly about to be described in detail is illustrated best in Figs. 2, 4 and 13 to 15, inclusive. Referring to these figures in particular, it may be seen that the tracing wheel assembly 16 and a relatively light speed reducing mechanism 22 are clamped for longitudinal adjustment upon the front arm 46 of the pantograph assembly by means of a pair of opposed clamping members 110, the upper one of which has welded to it a base plate 111 having a vertical flange 112 and upon which base plate the speed reducing mechanism is secured and from which the tracing wheel assembly 16 is suspended in swiveled fashion. In view of the fact that it is contemplated that any particular type of speed reducing mechanism, as long as it is fairly light, may be utilized in obtaining the benefits of the present invention, the mechanism 22 has not been illustrated and will not be described in detail. It is believed sufficient to state that it comprises a speed reducer unit 113 and a gear enclosing housing 113A. The former is mounted on the base plate as an independent unit, being connected by a flexible coupling 114 to the flexible shaft 20, which is supported in the flange 112 of the base plate. The speed reducer unit is operatively connected to the tracing wheel by a shaft 115 and a miter gear 116, as illustrated in Figs. 13 and 14.

The tracing wheel assembly is mounted in swiveled manner on the plate 111. The swivel mounting comprises a tubular supporting member 120 threaded at its upper end and secured to the plate by three nuts 122 providing an arrangement whereby the tube may be locked in adjusted position. A hollow tracing wheel supporting fork 124 is mounted for rotation in a pair of sleeve bearings 126 mounted at opposite ends of the interior of supporting member 120. Vertical movement of the fork is prevented by means of a shoulder 128 formed near the lower end of the fork stem and a pair of locking nuts 129 threaded to the upper end of the fork and abutting against the tubular supporting member 120.

The tracing wheel 100 is rotatably mounted upon a shaft 129 mounted at the lower end of a fork 130 formed by bending a single piece of metal into a substantially U-shape. The threaded end extends beyond the securing nut for the reception of a circle-cutting attachment to be described hereinafter. It is driven by the motor 18 through the flexible shaft, the speed-reducer unit 113, the miter gear 116, a bevel gear 131 mounted at the upper end of a vertically disposed shaft 132 journaled for rotation in a pair of bearings 134 mounted within the fork 124, a bevel gear 136 attached to the lower end of the shaft 132, a bevel gear 138 journaled in a bearing 140 secured to one of the fork arms, a spur gear 142 mounted upon a stub shaft 144 fixedly secured to the bevel gear 138 for rotation therewith, and a spur gear 146 of a somewhat lesser diameter than the tracing wheel 100 secured directly to the latter by means of a plurality of cap screws 148. The vertical shaft 132 is prevented from moving vertically by the opposed bevel gears 131 and 136 which abut against the previously mentioned bearings 134.

In order to prevent the likelihood of operators or others from coming in contact with the gears driving the tracing wheel, these are so proportioned with respect to the fork arm 130 that only the gear 146 extends beyond the confines of the fork arm and it is smaller in diameter than the tracing wheel.

The cutting torch 14 is mounted upon a supporting structure, indicated generally by the reference numeral 154, in such manner that it may be adjusted about pantograph member 46 and rotated in adjusted position to occupy various angular positions as well as to move longitudinally in opposite directions in any of its angular positions. The supporting structure comprises a back plate 156 welded directly to one of a pair of opposed clamping members 158, whereby the entire structure is mounted for rotational and longitudinal adjustment upon the front arm 46 of the pantograph assembly. It comprises, furthermore, a rectangular center plate 160 rotatably mounted, in a manner to be hereinafter described, with respect to the fixed back plate 156. The support comprises, further, a front plate 162, which is rotatable with the center plate 160 and movable longitudinally therealong to provide the longitudinal adjustment heretofore referred to. The front plate 162 has welded, or otherwise suitably secured thereto, a ring-shaped clamp 164, in which the torch is removably mounted.

Returning now to a more detailed description of the various plates comprising the torch support and the manner in which the various adjustments of the torch are obtained, reference is had first to Fig. 10. It may be seen that the rear plate 156 is provided at its lower end with an arcuate slot 166 and an aperture 168 through which extends a threaded stud 170 secured to the middle plate 160. A second threaded stud 172, likewise secured to the center plate 160, extends through the slot 166. When the wing nuts 174 and 176, respectively, are loosened, the plate 160 may be rotated angularly with respect to plate 156 about the pin 170 as a pivot.

To provide for longitudinal adjustment of the torch in all its angular positions, there is provided a rack bar 178 mounted upon the front plate 162 adapted to engage a spur gear 180 rotatable by a handle 182. The spur gear 180 and handle 182 are mounted upon a shaft 184 journaled for rotation upon a hook-shaped bracket 186 secured to the back of the center plate by a pair of countersunk screws or rivets 188. In order that the front plate may be moved with respect to the center plate and back plate, the former is provided with a pair of longitudinal slots 190 in vertical alignment with each other. The front plate is adjustably held in fixed relationship with the center plate by means of a pair of threaded studs 192 and a pair of wing nuts 194. When the wing nuts are loosened and the handle 182 is rotated, the front plate may be moved in opposite directions through the intermediary of the spur gear 180 and the rack bar 178, respectively. The front plate 162 is further prevented from moving laterally with respect to the center plate by means of a pair of flanges 195, extending forwardly from the center plate and adapted to engage the right edge of the front plate (as viewed in Fig. 10) and a pair of bearing blocks 196 secured to the center plate 160 so as to engage the left edge of the front plate.

Figure 12:
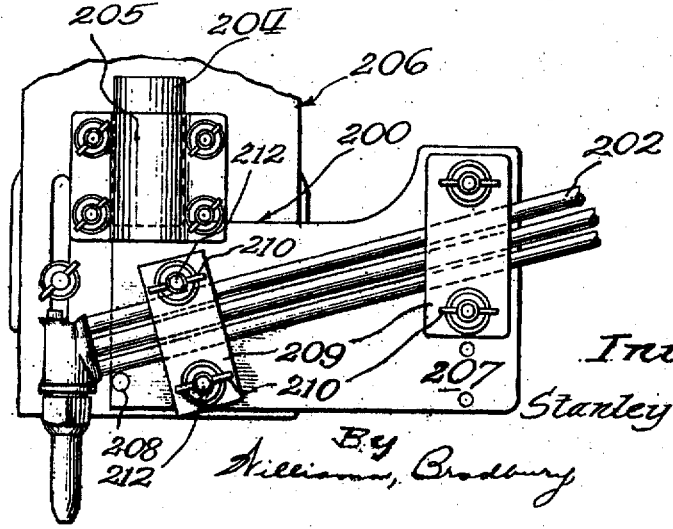
Fig. 12 is an enlarged front elevation of a different form of torch mounted in the torch support, only a small portion of which is illustrated in this figure.

An advantage of a torch support of the type described immediately above is that a number of different kinds of torches may be supported therein, so that it is not necessary to utilize with the apparatus a torch especially constructed for it. In Fig. 12 there is illustrated a clamping means 200 supporting a torch 202 of the type generally used when the torch is manipulated manually. The clamping means comprises a tubular member 204 adapted to be held in place by a clamp 205 forming part of a modified form of torch-supporting means 206 illustrated in Figs. 20 to 23 and which will be described shortly. To the lower end of the tubular member 204 is attached, as by welding, a plate-like supporting member 207 having a torch-positioning pin 208 secured to its lower left-hand corner. The torch 202 abuts against the pin 208 and is securely held in the position indicated by a pair of transverse clamping members 209 held against the torch by wing nuts 210 threaded upon studs 212 removably secured to the plate 207 in two of a number of threaded apertures.

The tracing wheel is driven steadily and regularly at selected speeds by the motor 18 which is connected to the flexible shaft 20 by a speed change unit indicated generally by the reference character 220 and illustrated in detail in Figs. 16 and 17. The motor and speed change units are mounted upon a base plate 222 suitably mounted upon the L-shaped frame as by bolts and rubber washers (not shown) to provide a substantially vibrationless power unit.

A plurality of torch speeds are obtained by utilizing two sets of pulleys of various diameters, one set indicated by reference character 224 being mounted upon a counter-shaft 226 and a second set indicated by reference character 228 being mounted upon a shaft 230 operatively connected to the flexible shaft 20. The pulleys are connected by a V belt 232 and the counter-shaft is driven by a V belt 234 interconnecting a pulley 236 mounted for rotation with the counter-shaft and a motor pulley 238 mounted for rotation with the shaft of motor 18.

Speed selection is made simple and easy by slidably mounting pulleys 224 on the counter-shaft and hingedly mounting the shaft 230. Slidable mounting of the pulleys 224 is obtained in a novel manner by securing all of these pulleys fixedly to a key 240 and mounting the unit comprising the key and pulleys for sliding movement upon the counter-shaft 226. Thus, alignment of the selected pulley 224 with the proper pulley 228 is insured.

The hinged mounting of shaft 230 permits loosening of the belt 232 so that it may be readily placed upon the desired pulleys. Accordingly, the hinged mounting is provided by mounting shaft 230 on a pair of spaced-apart pulley carrying supports 242 and 244. These are attached as by bolts 246 to a U-shaped mounting bracket welded or otherwise suitably secured to a shaft 248 mounted in a pair of spaced-apart supports 250 and 252 shown secured to the base plate 222 by bolts 254 and by welding 256.

The movement of the hinged shaft is restricted by a pin and slot connection comprising a pin 258 welded or otherwise secured to the shaft support 244 and a slot 260 formed in the support 252. A winged nut 262 is threaded on the pin 258 for the purpose of permitting adjustment of the position of shaft 230, as well as for locking the shaft in its desired adjusted position.

The driving belt 234 may be tightened in any desired manner as by mounting the motor 18 for limited movement upon the base plate 222. The flexible shaft 20 interconnecting the change speed unit and the speed reducer may be adjustably supported from the frame by a swinging bracket 264.

In operation, the tracing wheel 100 is propelled over the tracing table 24 either manually or by the motor 18. The tracing wheel may be made to follow a suitable templet, drawing, or other outline of the structure it is desired to have the torch cut. In case it is desired manually to propel the tracing wheel, it is necessary only to de-energize the motor 18 and to grasp the pantograph at some suitable point, preferably at the rotatable fork 124 or the fixed tubular sleeve 120 dependent upon whether the wheel is to be guided by hand or primarily by the templet to follow the desired outline or templet.

When the torch is driven by the motor, it is necessary only to energize the motor by connecting it to a suitable source of electric power. The belt 232 may be placed to interconnect the pulleys so as to provide proper speed of the torch for the most efficient cutting. The propulsion of the tracing wheel through a flexible shaft and a speed reducing mechanism mounted upon the pantograph assembly reduces the weight upon the latter, and consequently increases the operating efficiency and life of the apparatus. It has been found also that smoother operation results from rotating the flexible shaft at high speed. When operated at low speeds, the wire cable of the flexible shaft kinks and unkinks with resultant variations in speed at its output end, but when operated at high speeds and a speed reducer is employed, these variations have no appreciable effect on the movement of the tracing wheel. It may be mentioned that the motor 18 may be made sufficiently heavy for its intended purpose of driving the pantograph assembly, since its weight is not borne by the assembly. Thus, the unreliable operation of light motors now commonly mounted upon the assembly is avoided.

In practice, the speed reducer effects a reduction of 100 to 1, and there is an 8 to 1 reduction in the tracing wheel unit. The pulleys are so designed that with a motor rotating at 1750 R. P. M., tracing wheel speeds from 3 to 27 inches per minute are obtainable.

Ordinarily, the apparatus is operated with the torch mounted in the position indicated in Fig. 1, that is, with the tubular portion 32 arranged vertically and at a suitable height from the material being cut. The nozzle tip 34 may be adjusted to be at the desired distance from the material cut by manipulation of the adjusting wheel by means of handle 182, as previously described.

Whenever it is desirable to cut the metal at an angle other than the vertical, the torch may be rotated, as previously described, by loosening the wing nuts 174 and 176 and rotating the front plate with respect to the center plate 160.

The described structure furthermore is economical to build and substantially rigid in use. The pantograph assembly permits a wide range of movement of both the tracing wheel and the cutting torch which, as described above, duplicates the movement of the tracing wheel. The limits of movement of the tracing wheel and cutting torch, which are indicated in outline by the dotted lines 270 and 272, respectively, in Fig. 2, extend beyond the limits of the tracing table 24. This is an advantage rather than a disadvantage as it renders possible the use of a smaller tracing wheel table which, in turn, permits the work to be brought closer to the table.

Reference has previously been made to a circle-cutting attachment. This attachment is illustrated in Figs. 18 and 19 and upon reference to these figures it may be seen that the attachment comprises a suitably indexed rod 280 mounted upon a support 282 secured for rotation on the tracing wheel table 24 by a wing nut 284 threaded onto a reduced portion 286 of the support extending through the table. The extremity of the rod is secured to the threaded projecting end of the tracing wheel shaft 129 by an internally threaded sleeve 288.

The connection of the tracing wheel to the radius rod is so constructed that the tracing wheel can move some slight distance up or down without cramping the rod, yet it cannot swing sideways. These results are obtained by taper reaming, as indicated by reference character 283, the hole in post 282 through which the rod passes, and threading sleeve 288 so that the threaded end of rod 280 fits into it loosely and preventing sidewise motion by a pin 289 (see Fig. 18) passing horizontally through the sleeve and reduced end of the rod.

From the above description, it may be seen that when the tracing wheel is propelled on the surface of the tracing wheel table it will describe an arc, as it can move only about a center determind by the rod support 282. The radius of the circle described by the tracing wheel and likewise by the torch, is adjusted by varying the length of the rod 280 included between the tracing wheel and the support 282. Adjustment of the rod may be effected by loosening a wing nut 290 shown in Fig. 19, which is also utilized to secure the rod in its various positions of adjustment.

The torch-cutting apparatus may be provided with a modified form of torch-supporting means, such as that illustrated in Figs. 20 to 23, inclusive. The supporting means here illustrated is adjustable angularly in both directions from the longitudinal axis of the torch, as distinguished from the previously described torch-supporting means which is adjustable only in one direction.

Referring now to these figures, it may be seen that the torch-supporting means, indicated generally by reference character 300, comprises a back plate 302 having welded thereto one of a pair of opposed clamping members 304. The clamping members are adjustably secured to the front cross arm 46 of the pantograph assembly by a plurality of bolts 306. The clamping means is such as to permit longitudinal movement of the torch-supporting means along the cross arm 46 as well as rotational movement thereof about the cross arm. The supporting structure comprises also a rectangular center plate 308 rotatably mounted in a manner to be hereinafter described in the plane of and with respect to the fixed back plate 302. The support comprises further a front plate 310 which is rotatable with the center plate 308 and movable longitudinally therealong to provide adjustment of the torch longitudinally of its axis in various angular positions of the center and front plates. The front plate 310 has welded thereto a plurality of clamping bolts 312 and a seating block 314 for the torch 32. The torch 32 is held against the seating block 314 by a clamping member 316 and a plurality of wing nuts 318.

Returning to a more detailed description of the various plates comprising the torch support and the manner of obtaining the various adjustments of the torch, reference is had first to Fig. 23. From this figure it may be seen that the rear plate 302 is provided at its lower end with an arcuate slot 320 extending in both directions from the axis of the torch 32. A threaded stud 322 is welded or otherwise secured to the rear of the center plate 308. It extends through the slot 320 and has threaded thereon a wing nut 324 to permit adjustment of the front and center plates to various angular positions, such for instance as the angular position indicated in phantom in Fig. 23. The front and center plates rotate about a threaded stud 326 as a center. This stud is welded or otherwise secured to the rear of the center plate 308 and has associated therewith a wing nut 328 to permit as well as to aid in preventing undesired movement of these plates once they have been adjusted.

The front plate 310 is guided in its longitudinal movement with respect to the center plate 308 by a pair of guiding projections or lugs 330 formed at the lower end of the center plate and a pair of similar lugs or projections 332 formed at the upper end of the plate. Guiding action, as well as selective adjustment, is furnished by a pair of diagonally disposed slots 334 and 336 at the upper and lower ends of the front plate. These have associated therewith a pair of threaded studs 338 and 340, respectively, which are secured to the center plate and extend forwardly through the slots. Wing nuts 342 are associated with the studs so that the plates may be locked in desired adjusted position.

Relative movement between the center and front plates is effected by means of a manually manipulatable handle 344, a pinion 346 driven thereby and a vertically disposed rack bar 348 fixedly mounted upon the front plate. The handle 344 is attached to a shaft 350 mounting the pinion 346, as best shown in Fig. 22. The shaft and pinion are mounted for rotation upon the center plate which is provided with a projecting portion 352 bent back upon itself to provide a pair of spaced-apart bearings for the shaft 350.

Since the center plate is not movable longitudinally of the axis of the torch by reason of the studs 326 and 322 which extend therefrom through the fixed back plate, rotation of the pinion 346 after the wing nuts 342 have been loosened results in the longitudinal movement of the front plate and torch in a direction dependent upon the direction of rotation of the pinion 346. It may be seen therefore that there is provided a readily fabricated and easily manipulatable torch-supporting means which permits angular movement of the torch in both directions from the vertical and longitudinal movement of the torch in any of the angular positions.

Having thus described my invention, what I claim as new and desire to secure by Letters Patent of the United States is:

1. The combination including a stationary support having substantially an L-shaped form in a horizontal plane, a pivotally jointed pantograph assembly pivotally connected to the longer leg of said support so as to be universally movable above the support in a substantially horizontal plane in front of the longer leg, a rolling support for and attached to said structure movable in any direction over an area in the vicinity of the shorter leg of the L-shaped support, said shorter leg also extending forward from the longer leg, driving means connected to said assembly, and material working means secured to said structure for movement in unison therewith over an area spaced from the first mentioned area in a direction substantially parallel to and in the direction of the longer leg.

2. The combination including a stationary support having substantially an L-shaped form in a horizontal plane, a pivotally jointed pantograph assembly pivotally connected to said support so as to be universally movable above the support in a substantially horizontal plane in front of the longer leg of said support, a tracing wheel movable in any direction for supporting said structure, a tracing table mounted on the shorter leg of the L-shaped frame for universal angular adjustment with respect to a horizontal plane adapted to support said tracing wheel, said shorter leg extending forward from the longer leg, material working means supported by said structure for movement in unison therewith over an area spaced from the first mentioned area in a direction substantially parallel to and in the direction of the longer leg, and means for driving said pantograph assembly.

3. The combination including a metal working means, supporting means therefor universally movable in a predetermined plane, and means for mounting said working means on said supporting means, said last mentioned means including a primary support movable longitudinally of and angularly about said supporting means as an axis, and a secondary support mounted upon said primary support and movable angularly in a plane substantially at right angles to the plane of angular movement of said primary support, said working means being mounted upon said secondary support so as to lie in the plane of angular movement of said primary support.

4. The combination including metal working means, supporting means for said working means universally movable in a predetermined plane, and means for mounting said working means on said supporting means said last mentioned means including a primary support movable longitudinally of and angularly about said supporting means as an axis, and a secondary support mounted upon said primary support and movable from a normal position angularly in a plane substantially at right angles to the plane of angular movement of said primary support and linearly in any of its angular positions, said working means being mounted upon said secondary support so as normally to lie in the plane of angular movement of said primary support.

5. The combination including metal working means, supporting means for said working means universally movable in a substantially horizontal plane, and means for mounting said working means on said supporting means, said last mentioned means including a primary support mounted on said supporting means for longitudinal movement in a horizontal direction and for angular movement in a vertical plane, and a secondary support mounted on said primary support for longitudinal movement in the plane of angular adjustment of said primary support and for angular movement in a plane at right angles thereto.

6. The combination including a horizontally disposed support universally movable in a plane, a carriage mounting a torch releasably secured to said support and mounted thereon for longitudinal and rotary movement, said carriage comprising two portions, one of which is rotatable on said support and the other of which is both rotatable and movable longitudinally on said first portion, said other portion being movable longitudinally alongside and to both sides of the horizontally disposed support, and manually operable means on said one portion adapted to cooperate with complementary means on said other portion for imparting longitudinal movement to the latter in all angular positions of adjustment.

7. In apparatus of the type described, a carriage including, in combination, a substantially flat support, a pivotally adjustable substantially flat plate mounted on and adjacent said support for movement parallel to the surface of said support, a second substantially flat plate mounted on and adjacent to said first plate for pivotal movement with the first plate, said second plate being adjustably movable linearly with respect to said first plate, and cooperatively associated means on said plates for moving the second mentioned plate relative to the first mentioned plate.

8. In apparatus of the type described, a torch carriage including, in combination, a fixed, vertically disposed support, a pivotally adjustable plate mounted on said support, a second plate mounted on said support for pivotal movement with the first plate and adjustably movable linearly with respect to said first plate, a torch clamp mounted upon said second plate, a pin and slot connection between said first mentioned plate and fixed support for restricting pivotal movement in one direction from the vertical, and cooperatively associated gears mounted on said plates for effecting movement of the second mentioned plate relative to the first mentioned plate.

9. In apparatus of the type described, a torch carriage including, in combination, a fixed, vertically disposed support, a pivotally adjustable plate mounted on said support, a second plate mounted on said support for pivotal movement with the first plate and adjustably movable linearly with respect to said first plate, a torch clamp mounted upon said second plate, a pin and slot connection between said first mentioned plate and fixed support for restricting pivotal movement in one direction from the vertical, and cooperatively associated means on said plates for moving the second mentioned plate relative to the first mentioned plate, said means including a rack gear mounted on the second plate and a manually rotatable gear mounted on the first plate.

10. In apparatus of the type described, a torch carriage including, in combination, a fixed, vertically disposed support, a pivotally adjustable plate mounted on said support, a second plate mounted on said support for pivotal movement with the first plate and adjustably movable linearly with respect to said first plate, a torch clamp mounted upon said second plate, a pin and slot connection between said first mentioned plate and fixed support permitting pivotal movement in two angular directions from the vertical, and cooperatively associated gears mounted on said plates for effecting movement of the second mentioned plate relative to the first mentioned plate.

11. In apparatus of the type described, a torch carriage including, in combination, a fixed, vertically disposed support, a pivotally adjustable plate mounted on said support, a second plate mounted on said support for pivotal movement with the first plate and adjustably movable linearly with respect to said first plate, a torch clamp mounted upon said second plate, a pin and slot connection between said first mentioned plate and fixed support permitting pivotal movement in two angular directions from the vertical, and cooperatively associated means on said plates for moving the second mentioned plate relative to the first mentioned plate, said means including a rack gear mounted on the second plate and a manually rotatable gear mounted on the first plate.

12. An adapter for use with a torch support for a cylindrical torch to permit use of a manually manipulatable offset torch with the support, including in combination, a cylindrical portion adapted to be held by said support, a relatively flat torch support, spaced clamping means on said flat support for securing the manually manipulatable offset torch thereto, and a pin projecting from the plate for engagement with the offset torch to position it.

13. In apparatus of the type described, a torch carriage including in combination a fixed, vertically disposed support, a pivotally adjustable plate mounted on said support, a second plate mounted on said support for pivotal movement with the first plate and adjustably movable linearly with respect to said first plate, a torch clamp mounted upon said second plate, a pin and slot connection between said first mentioned plate and fixed support for adjustably securing the plate to said support in adjusted positions, a pin and slot connection between said first and second plates for adjustably securing them in adjusted positions, and cooperatively associated means on said plates for effecting movement of the second mentioned plate relative to the first mentioned plate upon release of the pin and slot connection therebetween.

STANLEY W. HAYES.

---

CERTIFICATE OF CORRECTION.

Patent No. 2,317,526.                April 27, 1943.

STANLEY W. HAYES.

It is hereby certified that error appears in the printed specification of the above numbered patent requiring correction as follows: Page 1, first column, line 26, after "fabricated" insert --simply--; and second column, line 15, for "los" read --loss--; and that the said Letters Patent should be read with this correction therein that the same may conform to the record of the case in the Patent Office.

Signed and sealed this 27th day of July, A. D. 1943.

(Seal)

Henry Van Arsdale,
Acting Commissioner of Patents.

carriage including, in combination, a fixed, vertically disposed support, a pivotally adjustable plate mounted on said support, a second plate mounted on said support for pivotal movement with the first plate and adjustably movable linearly with respect to said first plate, a torch clamp mounted upon said second plate, a pin and slot connection between said first mentioned plate and fixed support for restricting pivotal movement in one direction from the vertical, and cooperatively associated gears mounted on said plates for effecting movement of the second mentioned plate relative to the first mentioned plate.

9. In apparatus of the type described, a torch carriage including, in combination, a fixed, vertically disposed support, a pivotally adjustable plate mounted on said support, a second plate mounted on said support for pivotal movement with the first plate and adjustably movable linearly with respect to said first plate, a torch clamp mounted upon said second plate, a pin and slot connection between said first mentioned plate and fixed support for restricting pivotal movement in one direction from the vertical, and cooperatively associated means on said plates for moving the second mentioned plate relative to the first mentioned plate, said means including a rack gear mounted on the second plate and a manually rotatable gear mounted on the first plate.

10. In apparatus of the type described, a torch carriage including, in combination, a fixed, vertically disposed support, a pivotally adjustable plate mounted on said support, a second plate mounted on said support for pivotal movement with the first plate and adjustably movable linearly with respect to said first plate, a torch clamp mounted upon said second plate, a pin and slot connection between said first mentioned plate and fixed support permitting pivotal movement in two angular directions from the vertical, and cooperatively associated gears mounted on said plates for effecting movement of the second mentioned plate relative to the first mentioned plate.

11. In apparatus of the type described, a torch carriage including, in combination, a fixed, vertically disposed support, a pivotally adjustable plate mounted on said support, a second plate mounted on said support for pivotal movement with the first plate and adjustably movable linearly with respect to said first plate, a torch clamp mounted upon said second plate, a pin and slot connection between said first mentioned plate and fixed support permitting pivotal movement in two angular directions from the vertical, and cooperatively associated means on said plates for moving the second mentioned plate relative to the first mentioned plate, said means including a rack gear mounted on the second plate and a manually rotatable gear mounted on the first plate.

12. An adapter for use with a torch support for a cylindrical torch to permit use of a manually manipulatable offset torch with the support, including in combination, a cylindrical portion adapted to be held by said support, a relatively flat torch support, spaced clamping means on said flat support for securing the manually manipulatable offset torch thereto, and a pin projecting from the plate for engagement with the offset torch to position it.

13. In apparatus of the type described, a torch carriage including in combination a fixed, vertically disposed support, a pivotally adjustable plate mounted on said support, a second plate mounted on said support for pivotal movement with the first plate and adjustably movable linearly with respect to said first plate, a torch clamp mounted upon said second plate, a pin and slot connection between said first mentioned plate and fixed support for adjustably securing the plate to said support in adjusted positions, a pin and slot connection between said first and second plates for adjustably securing them in adjusted positions, and cooperatively associated means on said plates for effecting movement of the second mentioned plate relative to the first mentioned plate upon release of the pin and slot connection therebetween.

STANLEY W. HAYES.

---

CERTIFICATE OF CORRECTION.

Patent No. 2,317,526.      April 27, 1943.

STANLEY W. HAYES.

It is hereby certified that error appears in the printed specification of the above numbered patent requiring correction as follows: Page 1, first column, line 26, after "fabricated" insert --simply--; and second column, line 15, for "los" read --loss--; and that the said Letters Patent should be read with this correction therein that the same may conform to the record of the case in the Patent Office.

Signed and sealed this 27th day of July, A. D. 1943.

Henry Van Arsdale,
Acting Commissioner of Patents.

(Seal)

CERTIFICATE OF CORRECTION.

Patent No. 2,317,526. April 27, 1943.

STANLEY W. HAYES.

It is hereby certified that error appears in the printed specification of the above numbered patent requiring correction as follows: Page 1, first column, line 26, after "fabricated" insert --simply--; and second column, line 15, for "los" read --loss--; and that the said Letters Patent should be read with this correction therein that the same may conform to the record of the case in the Patent Office.

Signed and sealed this 27th day of July, A. D. 1943.

(Seal)

Henry Van Arsdale,
Acting Commissioner of Patents.